(12) United States Patent
Chen et al.

(10) Patent No.: US 11,360,523 B2
(45) Date of Patent: Jun. 14, 2022

(54) HINGE ASSEMBLIES WITH COMPOSITE NECK SHAFTS

(71) Applicant: Hewlett-Packard Development Company, L.P., Spring, TX (US)

(72) Inventors: Wei-Chung Chen, Taipei (TW); Kuan-Ting Wu, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/481,462

(22) PCT Filed: Mar. 6, 2018

(86) PCT No.: PCT/US2018/020998
§ 371 (c)(1),
(2) Date: Jul. 27, 2019

(87) PCT Pub. No.: WO2019/172883
PCT Pub. Date: Sep. 12, 2019

(65) Prior Publication Data
US 2021/0405709 A1    Dec. 30, 2021

(51) Int. Cl.
*G06F 1/16*      (2006.01)
*E05D 11/08*     (2006.01)

(52) U.S. Cl.
CPC ............ *G06F 1/1681* (2013.01); *E05D 11/08* (2013.01)

(58) Field of Classification Search
CPC combination set(s) only.
See application file for complete search history.

(56) References Cited

U.S. PATENT DOCUMENTS

| | | | |
|---|---|---|---|
| 5,008,976 A * | 4/1991 | Busch | G06F 1/1616 16/276 |
| 5,812,908 A * | 9/1998 | Larocca | G03G 15/75 399/90 |
| 6,381,808 B1 | 5/2002 | Kida | |
| 7,811,310 B2 | 10/2010 | Baker et al. | |
| 7,979,960 B2 * | 7/2011 | Sano | G06F 1/1681 16/367 |
| 8,593,794 B2 * | 11/2013 | Shao | G06F 1/1681 361/679.01 |
| 8,616,818 B2 | 12/2013 | Travis | |
| 8,745,875 B1 | 6/2014 | Hagelthorn | |
| 9,091,105 B2 * | 7/2015 | Sayama | E05D 3/18 |
| 9,094,490 B2 * | 7/2015 | Sayama | G06F 1/1616 |
| 9,340,991 B2 | 5/2016 | Yandell | |
| 9,684,343 B2 * | 6/2017 | Tazbaz | G06F 1/1618 |
| 2006/0272127 A1 * | 12/2006 | Chen | G06F 1/1681 16/340 |

(Continued)

FOREIGN PATENT DOCUMENTS

JP      2000145757 A     5/2000

OTHER PUBLICATIONS

Bearing Lock Nuts—With Tooth Lock Washer, 2017, Misumi.

*Primary Examiner* — Lisa Lea-Edmonds
(74) *Attorney, Agent, or Firm* — Global IP Services PLLC

(57) ABSTRACT

In one example, a hinge assembly is disclosed, which may include a first bracket, a second bracket, and a shaft to pivotally connect the first bracket and the second bracket. The shaft may have a composite neck portion. The composite neck portion may include a metal portion and a non-metallic washer fixedly attached to the metal portion.

14 Claims, 7 Drawing Sheets

(56) References Cited

U.S. PATENT DOCUMENTS

| | | | |
|---|---|---|---|
| 2007/0289091 A1 | 12/2007 | Espey | |
| 2008/0034545 A1* | 2/2008 | Shieh | G06F 1/162 16/367 |
| 2008/0078058 A1* | 4/2008 | Hsu | G06F 1/1681 16/337 |
| 2008/0184529 A1* | 8/2008 | Thom | E05D 11/087 16/337 |
| 2011/0258810 A1* | 10/2011 | Chiang | H04M 1/0216 16/297 |
| 2012/0212924 A1* | 8/2012 | Nakajima | G06F 1/1681 361/807 |
| 2013/0160244 A1* | 6/2013 | Sayama | G06F 1/1681 16/370 |
| 2013/0192140 A1* | 8/2013 | Sayama | G06F 1/1616 49/386 |
| 2014/0331452 A1* | 11/2014 | Zhang | G06F 1/1681 16/337 |
| 2015/0169014 A1* | 6/2015 | Rivera | G06F 1/1681 361/679.21 |
| 2015/0204374 A1 | 7/2015 | Stewart | |
| 2018/0164855 A1* | 6/2018 | Tazbaz | G06F 1/1641 |

* cited by examiner

HINGE ASSEMBLIES WITH COMPOSITE NECK SHAFTS

BACKGROUND

Electronic devices such as laptop computers, tablet computers, convertible devices, mobile phones, and the like may include a first housing, a second housing, and a hinge assembly mounted between the first housing and the second housing. For example, the first housing may house a keyboard, a motherboard, and/or other components. The second housing may house a display. The hinge assembly may be pivotally connected to the first housing and the second housing along an axis.

BRIEF DESCRIPTION OF DRAWINGS

Examples are described in the following detailed description and in reference to the drawings, in which.

DETAILED DESCRIPTION

Hinged electronic devices such as laptop computers, tablet computers, personal digital assistants (PDAs), and flip mobile phones may include a base housing and a display housing connected by a hinge. The display housing may include a display (e.g., a touchscreen) and the base housing may include input devices, such as a keyboard, a pointing stick, mouse buttons, a touchpad, and/or a trackpad. The display housing may be attached to the base housing such that the display housing can be moved and/or rotated with respect to the base housing along an axis to hold the display at multiple positions, To achieve such rotation, the display housing can be attached to the base housing using at least one hinge that will allow the display housing to be rotated about the base housing.

Further, the hinges may include a pair of brackets and a shaft having a neck portion. The shaft including the neck portion may be made of a metal, such as steel. The neck portion may be designed using Computer Numeric Control (CNC) machining of the shaft. Further, at least one of the brackets may be disposed between the neck portion and a friction mechanism such that a frictional force may be generated between the first bracket and the second bracket. However, such neck portions may add to a weight of the shaft, which in turn increases the weight of the hinges.

Examples described herein may provide a hinge assembly for an electronic device, which includes a shaft having a composite neck portion. The composite neck portion may be formed of a metal portion and a non-metallic washer (e.g., a carbon fiber washer) that can be press fitted and adhered or glued to the metal portion. The composite neck portion with the carbon fiber washer may increase torsional resistance (e.g., for small diameter hinges), reduce a length of the neck portion, and also reduce the weight of the hinge assembly.

In the following description, for purposes of explanation, numerous specific details are set forth in order to provide a thorough understanding of the present techniques. It will be apparent, however, to one skilled in the art that the present apparatus, devices and systems may be practiced without these specific details. Reference in the specification to "an example" or similar language means that a particular feature, structure, or characteristic described may be included in at least that one example, but not necessarily in other examples.

Examples described herein may provide a hinge assembly for an electronic device, which may include a first bracket, a second bracket, and a shaft to pivotally connect the first bracket and the second bracket. The shaft may have a composite neck portion. The composite neck portion may include a metal portion and a non-metallic washer, such as a carbon fiber washer, fixedly attached to the metal portion.

Figure 1:
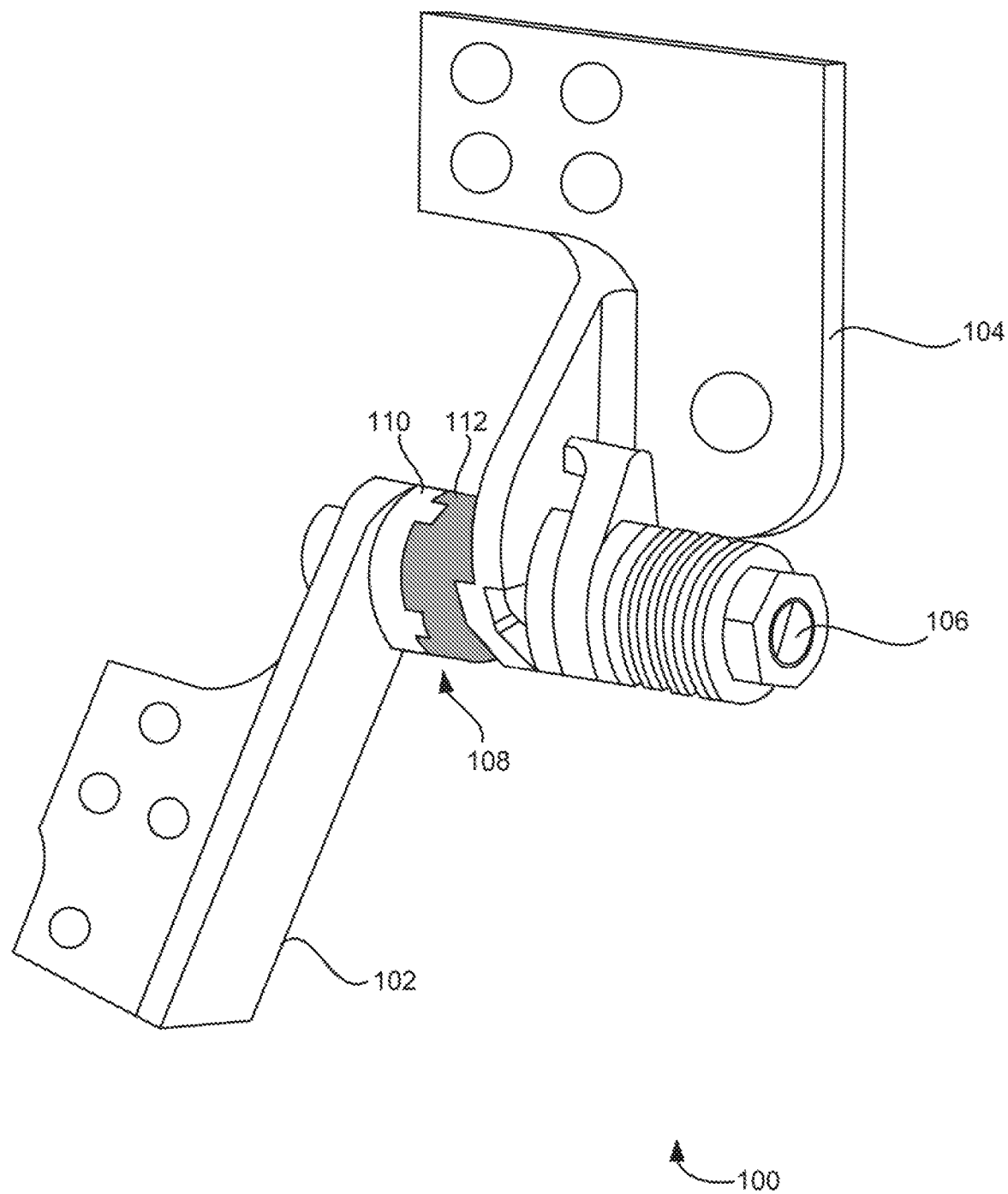
FIG. 1 is a perspective view of an example hinge assembly for an electronic device.

Referring to the figures, FIG. 1 is a perspective view of an example hinge assembly 100 for an electronic device. Example hinge assembly 100 may be a single-axis hinge assembly, Hinge assembly 100 may pivotally connect a first housing to a second housing along an axis, e.g., an axis of rotation. Example hinge assembly 100 may include a first bracket 102, a second bracket 104, and a shaft 106. First bracket 102 may fixedly hold shaft 106 at one end. In one example, first bracket 102 may be fixedly engaged with shaft 106 such that shaft 106 rotates along with first bracket 102.

Further, second bracket 104 may be rotatably mounted on shaft 106 such that second bracket 104 is pivotably coupled to first bracket 102 along the axis. In one example, first bracket 102 may engage with the first housing and second bracket 104 may engage with the second housing. Example first housing may be a base housing and example second housing may be a display housing or vice versa.

Figure 2:
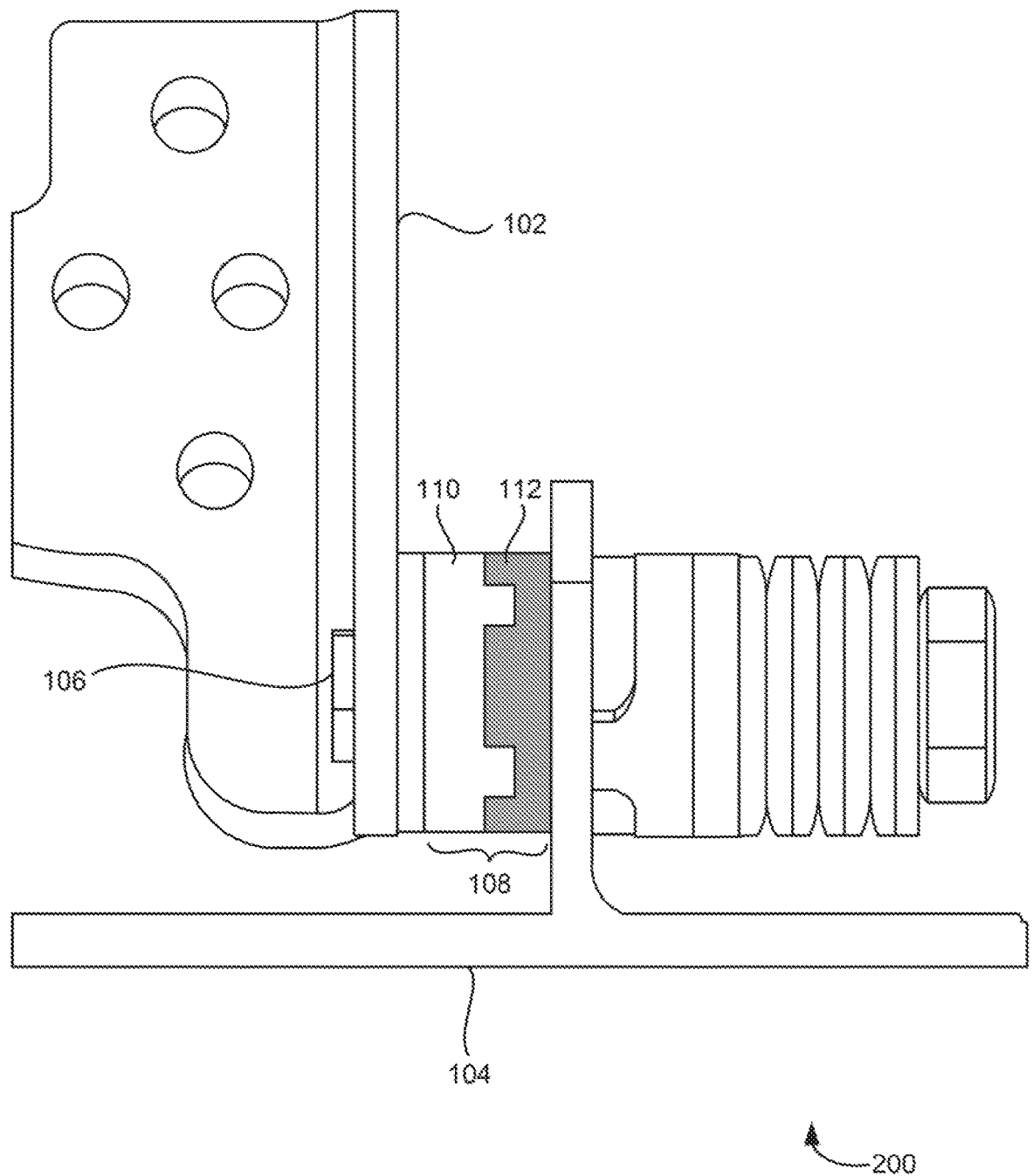
FIG. 2 is a side view of another example hinge assembly.

In one example, first bracket 102 can be fixed to the base housing of the electronic device and second bracket 104 can be fixed to the display housing of the electronic device. In another example, first bracket 102 can be fixed with the display housing of the electronic device and second bracket 104 can be fixed to the base housing of the electronic device. FIG. 2 is a perspective view of another example hinge assembly 200, where first bracket 102 can be fixed to the display housing and second bracket 104 can be fixed to the base housing. For example, similarly named elements of FIG. 2 may be similar in structure and/or function to elements described with respect to FIG. 1.

In one example, shaft 106 may have a composite neck portion 108, Composite neck portion 108 may include a metal portion 110 and a non-metallic washer 112 fixedly attached to metal portion 110. Example non-metallic washer 112 may be constructed, at least partially, of carbon fiber. In one example, non-metallic washer 112 may be mounted on shaft 106 and attached to metal portion 110 through a press fit and adhesive or glue via respective connecting features. In other examples, non-metallic washer 112 may be coupled to metal portion 110 by welding, adhesive, a hook and notch configuration, or the like.

Figure 3A:
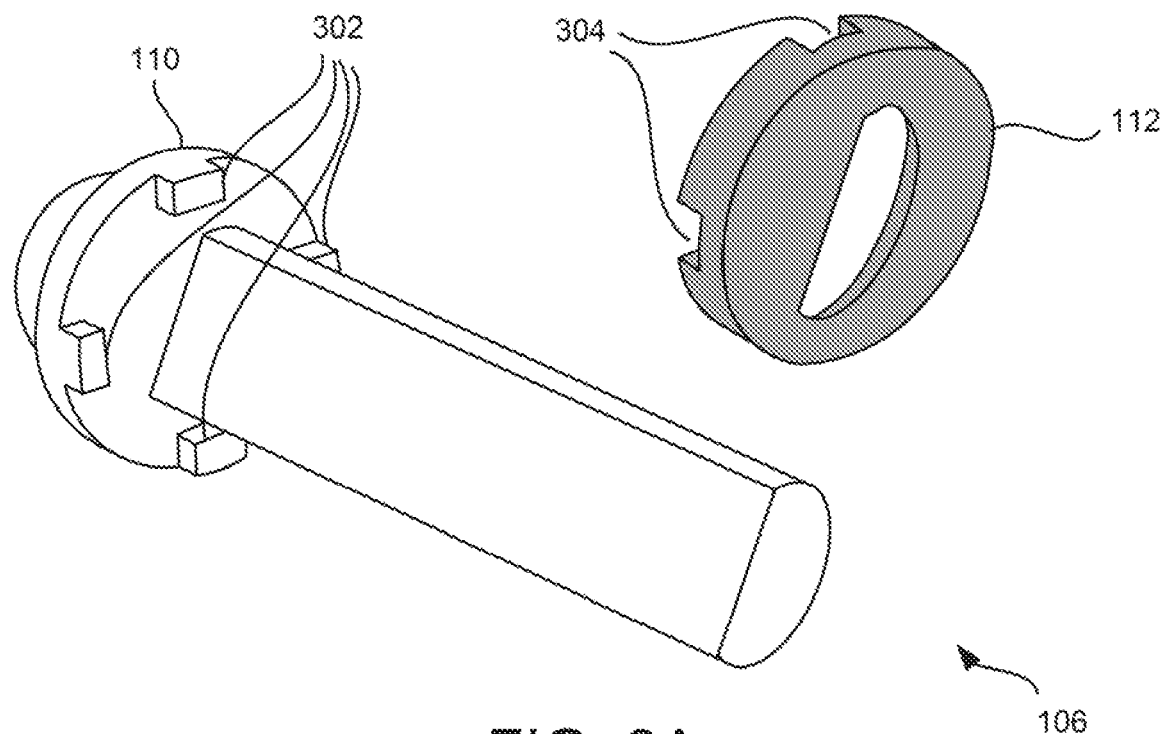
FIG. 3A is an exploded view of an example shaft of the example hinge assembly of FIG. 1, depicting connecting features of a metal portion and a non-metallic washer.

FIG. 3A is an exploded view of example shaft 106 of FIG. 1, depicting connecting features of metal portion 110 and non-metallic washer 112. As shown in FIG. 3A, metal portion 110 may have first connecting feature 302. Example first connecting feature 302 may include at least one protrusion that protrudes from a surface of metal portion 110.

Further, as shown in FIG. 3A, non-metallic washer 112 may have a second connecting feature 304. Example second connecting feature 304 may include at least one recess to receive respective protrusions of metal portion 110.

Figure 3B:
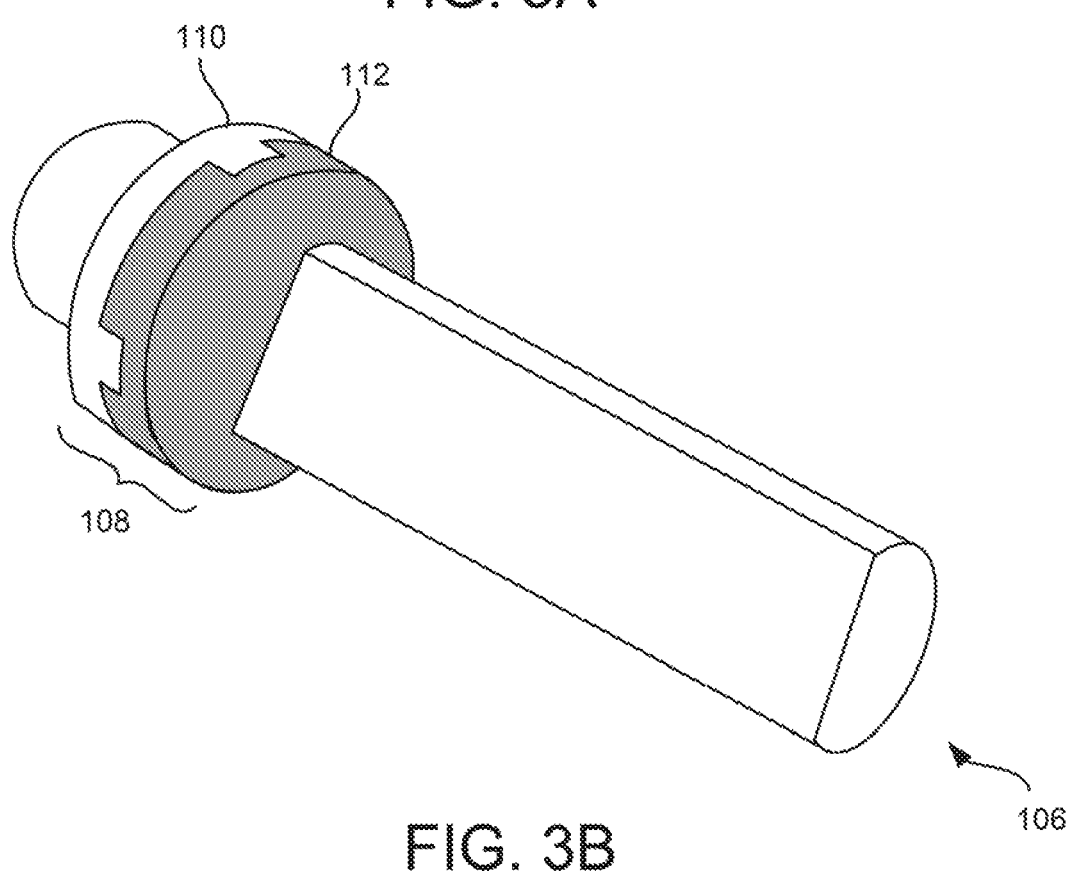
FIG. 3B is a perspective view of the example shaft of FIG. 3A, depicting the non-metallic washer attached to the metal portion via respective connecting features.

FIG. 3B is a perspective view of example shaft 106 of FIG. 3A, depicting non-metallic washer 112 and metal portion 110 that are attached through the press fit and glue via first connecting feature 302 and second connecting feature 304 to provide locking between metal portion 110 and non-metallic washer 112. First and second connecting features 302 and 304 may prevent non-metallic washer 112 from rotating, during rotation of second bracket 104. For example, shaft may be rectangular, square, triangular, elliptical, or may have any other suitable cross-section. Further, composite neck portion 108 may include a shape such as, for example, a circular shape, a rectangular shape, a triangular shape, an elliptical shape, or any other appropriate shape.

Figure 4A:
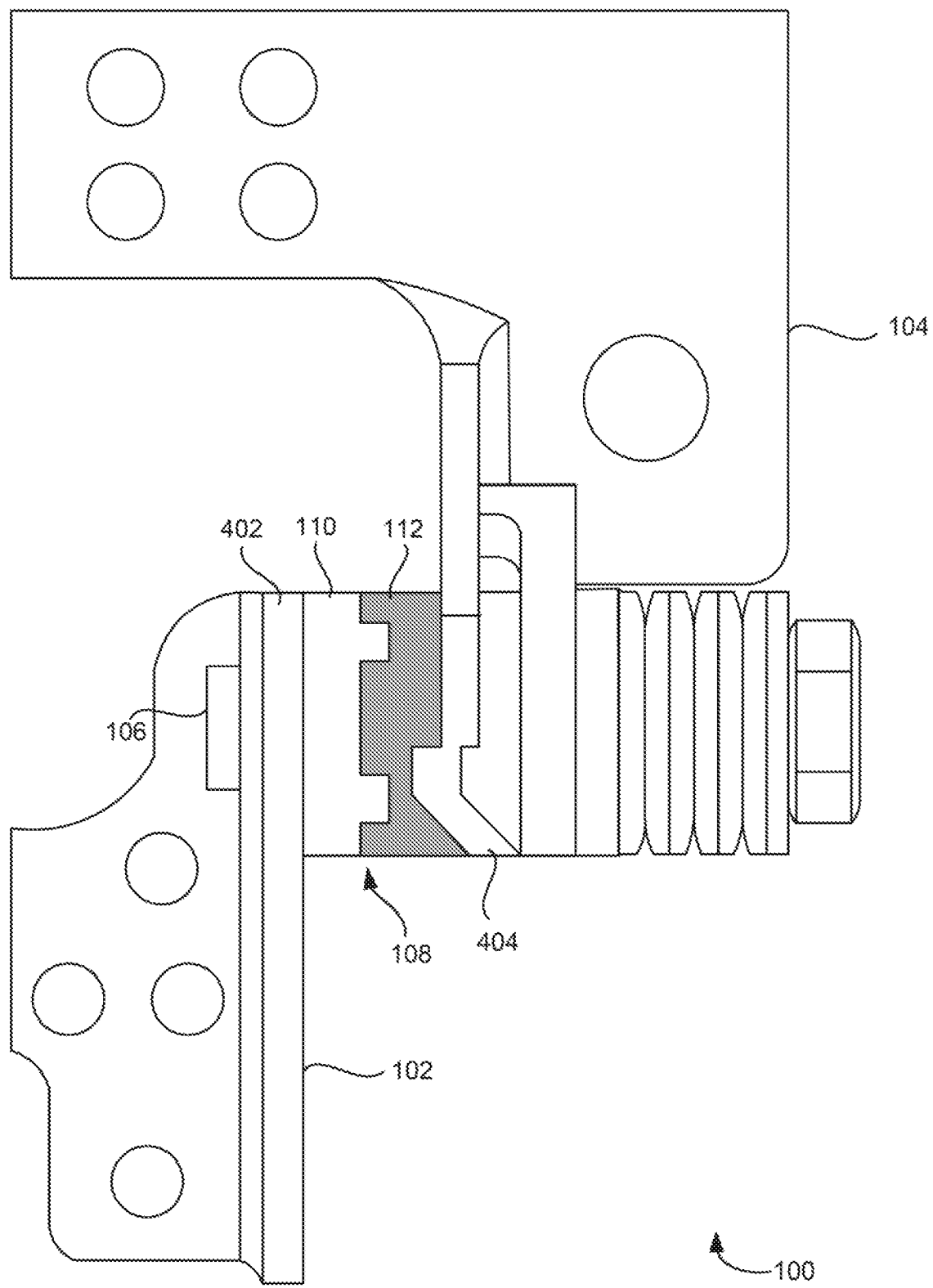
FIGS. 4A and 4B illustrate a front view of the example hinge assembly of FIG. 1, depicting additional features.
Figure 4B:
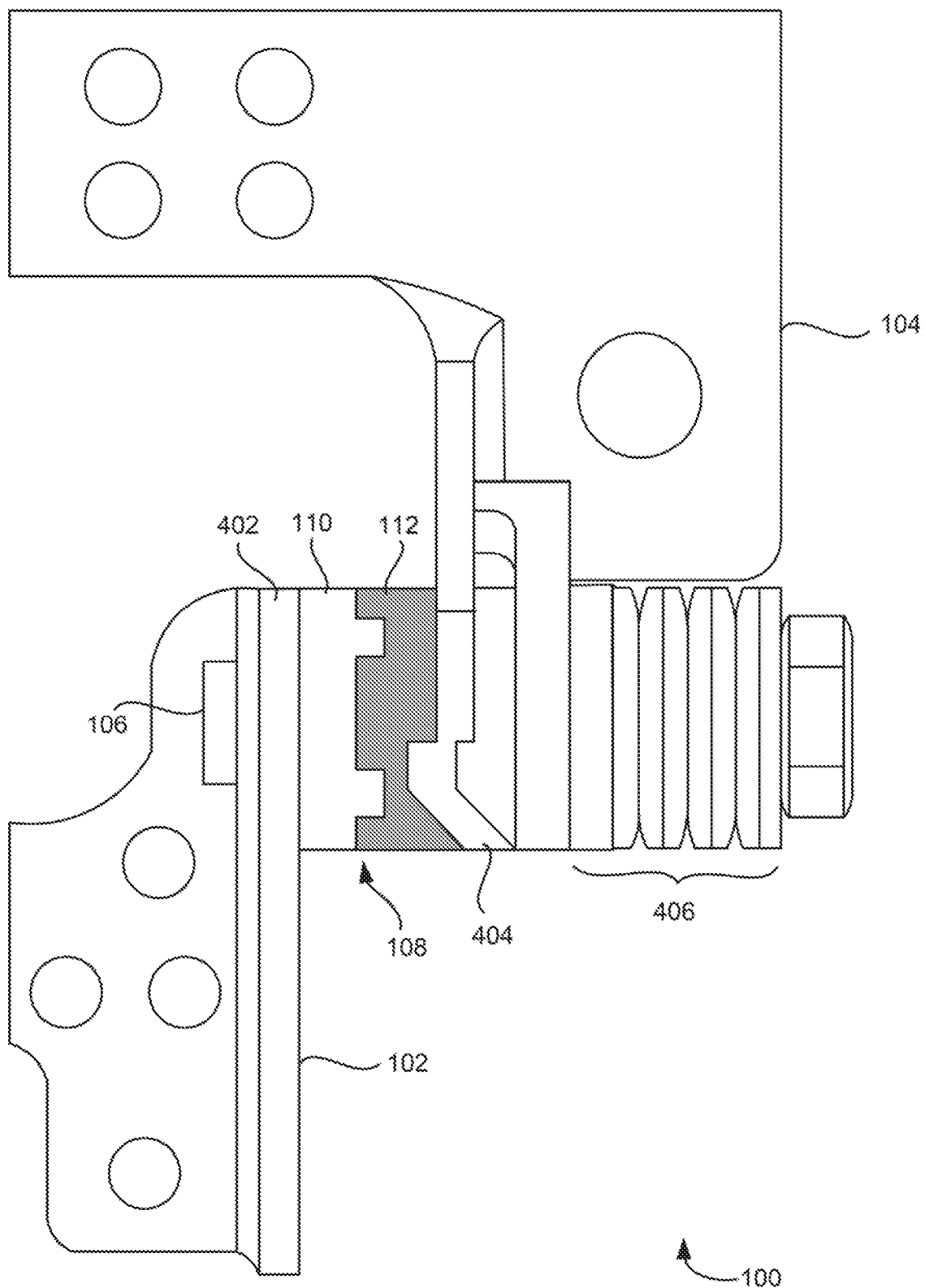

FIGS. 4A and 4B illustrate a front view of example hinge assembly 100 of FIG. 1, depicting additional features. As shown in FIG. 4A, hinge assembly 100 may include shaft 106 having composite neck portion 108. In one example, composite neck portion 108 may include a metal portion 110 and a non-metallic washer 112 fixedly attached to metal portion 110.

Further, first bracket 102 may have an adaptor portion 402 fixedly holding shaft 106 at a first end. Second bracket 104 may have a flange portion 404 rotatably mounted on shaft 106 such that second bracket 104 may be rotatably coupled to first bracket 102. In one example, non-metallic washer 112 may engage with second bracket 104 to provide a torsional resistance to second bracket 104 during rotational movement of second bracket 104 relative to first bracket 102. For example, composite neck portion 108 may be disposed/formed between first bracket 102 and second bracket 104 such that non-metallic washer 112 may physically engage with flange portion 404 of second bracket 104.

As shown in FIG. 4B, hinge assembly may include a friction mechanism 406 mounted on shaft 106 at a second end and compressively engaged with second bracket 104 to provide frictional force between first bracket 102 and second bracket 104. An example friction mechanism 406 is explained in FIG. 5.

Figure 5:
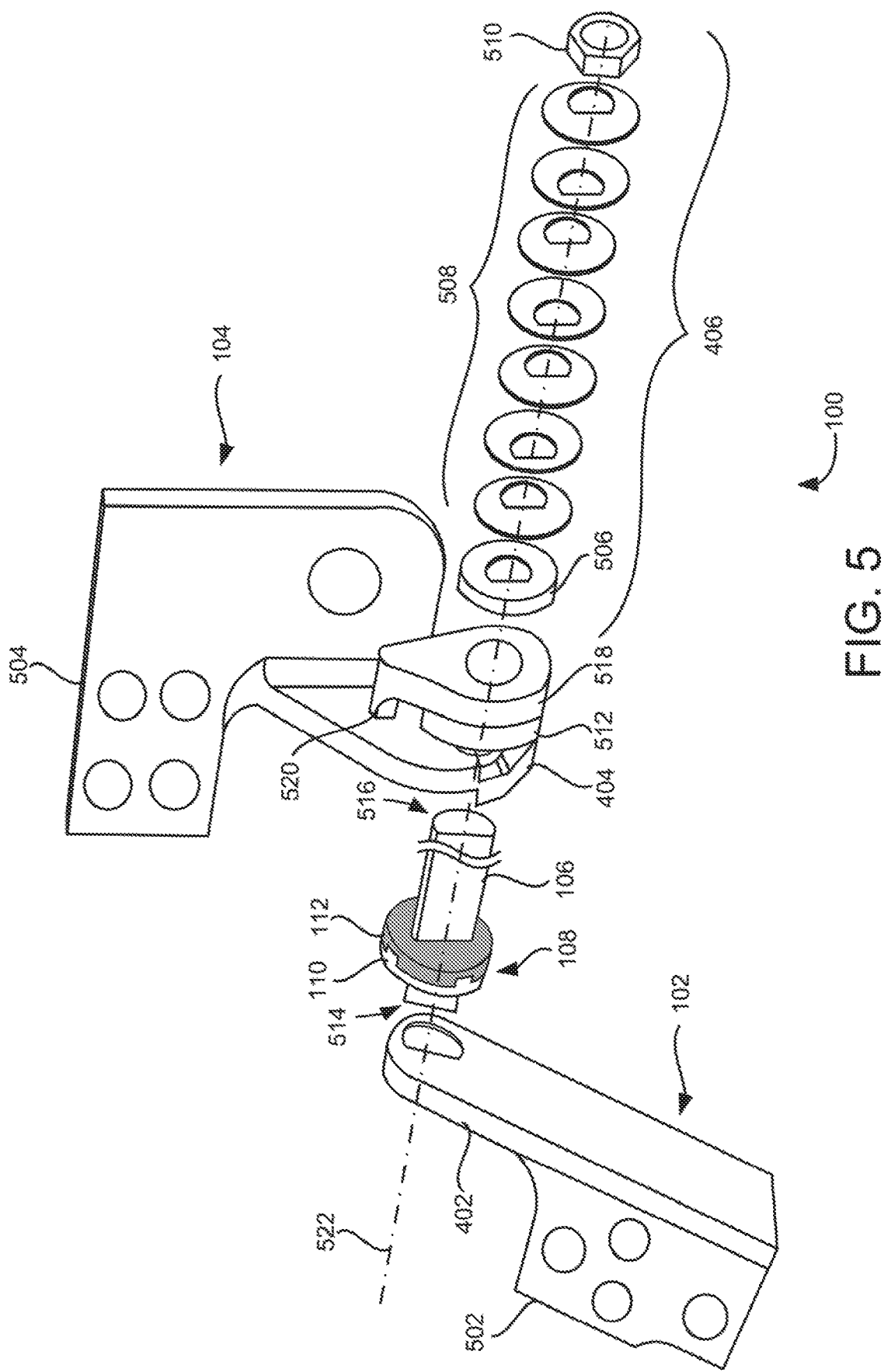
FIG. 5 is an exploded view of an example hinge assembly.

FIG. 5 is an exploded view of example hinge assembly 100 of FIG. 1. First bracket 102 may include a mounting portion 502 that can be fixedly engaged with the first housing of the electronic device. Furthermore, first bracket 102 may have an adaptor portion 402 that can fixedly hold shaft 106 at a first end 514. For example, first end 514 of shaft 106 may include at least one flat surface and is inserted into a similarly shaped bore within adaptor portion 402.

Further, second bracket 104 may include a mounting portion 504 that can be fixedly engaged with the second housing of an electronic device. Further, second bracket 104 may include flange portion 404 that can be rotatably mounted on shaft 106. As shown in FIG. 5 flange portion 404 may be perpendicular to mounting portion 504 to rotatably hold shaft 106 along an axis 522.

Also, friction mechanism 406 may include a cam mechanism portion for holding the second housing (e.g., display housing) at multiple positions. Friction mechanism 406 may be composed of a first cam member 518 having a first cam face at one side. Another side of first cam member 518 may be fixedly engaged with flange portion 404 via a coupling feature/protruding feature 520. Further, friction mechanism 406 may include a second cam member 506 having a second cam face at one side, the second cam face provided corresponding to the first cam face.

Furthermore, friction mechanism 406 may include a fastener 510 secured to shaft 106 at second end 516. Also, friction mechanism 406 may include at least one disc-spring 508 disposed between second cam member 506 and 510. At least one disc-spring 508 may be disposed on other side of second cam member 506, which is opposite to the second cam face. Further, fastener 510 may be secured to second end 516 of shaft 106 such that disc-springs 508 may be compressively disposed between fastener 510 and second cam member 506. In one example, disc-springs 508 may apply an elastic force to second cam member 506. For example, disc-springs 508 may be formed of high tensile steel to have the cross section like a gentle curve, and attached to shaft 106 such that the concave faces of two disc-springs may be confronted and combined to form a pair. For example, one pair of disc-springs 508 may be deformed according to an external force to cause a resiliency, when an external force is applied in a direction compressing the convex faces.

In one example, shaft 106 may rotatably support second bracket 104 and first cam member 518, and unrotatably supports first bracket 102, second cam member 506, disc-springs 508, and fastener 510. For example, first cam member 518 and flange portion 404 may include an opening/bore through which shaft 106 may be rotatably received. For example, flange portion 404 and first cam member 518 may have a circular opening having a larger area than the cross section of shaft 106 and may be attached to shaft 106 such that shaft 106 is rotatable within the circular opening. In another example, shaft 106 may include at least one flat surface and may be inserted into a similarly shaped bore/opening within first bracket 102, second cam member 506, disc-springs 508, and fastener 510 such that first bracket 102, second cam member 506, disc-springs 508, and fastener 510 rotates along with shaft 106.

FIGS. 1 to 5 illustrate an example friction mechanism, however, examples described herein can also be used in other hinge structures having different friction mechanisms that provide frictional resistance between the first housing and the second housing.

Further as shown in FIG. 5, hinge assembly 100 may include a washer member 512 mounted on shaft 106 and disposed between first cam member 518 and flange portion 404 at one side of flange portion 404. Composite neck portion 108 may be disposed/formed between first bracket 102 and second bracket 104 such that non-metallic washer 112 may physically engage with other side of flange portion 404 to provide stability/torsional resistance for the first housing at selected positions.

Even though FIGS. 1-5 illustrate an example hinge assembly 100, examples described herein can also be used in other hinge structures, provided that first bracket 102 rotates in directions about the pivot axis relative to second bracket 104 along a single-axis or a double-axis. In double-axis construction, two shafts may be separately attached to the device parts and a coupling is engaged with the two shafts to allow the shafts to be used as two pivot axes.

Figure 6:
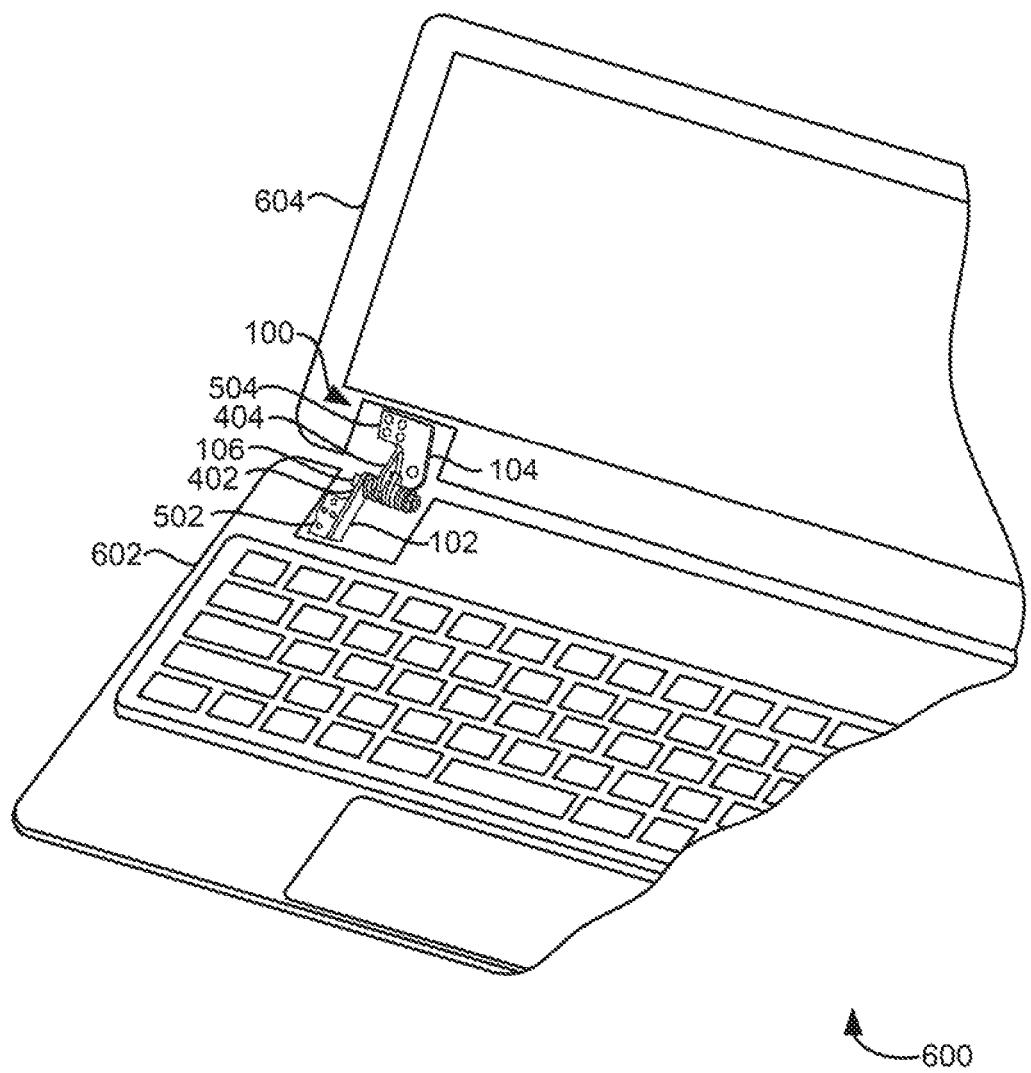
FIG. 6 is a perspective view of a portion of an example electronic device including an example hinge assembly.

FIG. 6 is a perspective view of a portion of an example electronic device 600 including example hinge assembly 100, such as shown in FIGS. 1, 2, 4A, 4B, and 5. Electronic device 600 may include a first housing 602 (e.g, base housing) and a second housing 604 (e.g., display housing) pivotally connected to first housing 602 via hinge assembly 100. Example electronic device 600 may be a computing system, for example, a laptop, a convertible device, a PDA, a notebook, a sub-notebook, a personal gaming device, or other computing device with second housing 604 closeable onto first housing 602, Example convertible device may refer to a device that can be "converted" from a laptop mode to a tablet mode. In the tablet mode, second housing 604 may be closed with a display facing up and viewable, i.e., first housing 602 may be substantially parallel to and adjacent to second housing 604. Electronic device 600 may include a pair of hinge assemblies to pivotally connect first housing 602 and second housing 604, each of the pair of hinge assemblies may be substantially similar to hinge assembly 100. Second housing 604 can be rotated between a closed position and an open position.

For example, first housing 602 may house a keyboard, a battery, a touchpad, and so on, Second housing 604 may house a display (e.g., a touchscreen display). Example display may include liquid crystal display (LCD), light emitting diode (LED), electro-luminescent (EL) display, micro LED display, or the like. Electronic device 600 may be equipped with other components such as a camera, audio/video devices, and the like, depending on the functions of electronic device 600. Hinge assembly 100 may be pivotally connected to first housing 602 and second housing 604 along a pivot axis. Hinge assembly 100 may allow second housing 604 to rotate in directions about the pivot axis relative to first housing 602.

Example hinge assembly 100 may include shaft 106 having a composite neck portion. In one example, composite neck portion may include a metal portion and a non-metallic washer fixedly attached to the metal portion. Example hinge assembly 100 may include first bracket 102 having a first portion (e.g., adaptor portion 402) fixedly holding shaft 106 and second portion (e.g., mounting portion 502) fixedly engaged with first housing 602, Further, example hinge assembly 100 may include second bracket 104 having a third portion (e.g, flange portion 404) rotatably mounted on shaft 106 and a fourth portion (e.g., mounting portion 504) fixedly engaged with second housing 604. In one example, non-metallic washer may engage with second bracket 104 to provide a torsional resistance to second housing 604.

It may be noted that the above-described examples of the present solution are for the purpose of illustration only, Although the solution has been described in conjunction with a specific example thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on," as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims,

What is claimed is:

1. A hinge assembly comprising:
   a first bracket to engage with a first housing of an electronic device;
   a second bracket to engage with a second housing of the electronic device; and
   a shaft to pivotally connect the first bracket and the second bracket, wherein the shaft has a composite neck portion, wherein the composite neck portion comprises:
   a metal portion; and
   a non-metallic washer fixedly attached to the metal portion.

2. The hinge assembly of claim 1, wherein the non-metallic washer comprises carbon fiber.

3. The hinge assembly of claim 1, wherein the non-metallic washer is mounted on the shaft and attached to the metal portion through a press fit and adhesive.

4. The hinge assembly of claim 1, wherein the metal portion comprises a first connecting feature and the non-metallic washer comprises a second connecting feature, wherein the non-metallic washer is attached to the metal portion through the first connecting feature and the second connecting feature to provide locking between the metal portion and the non-metallic washer.

5. A hinge assembly for an electronic device, comprising:
   a shaft having a composite neck portion, wherein the composite neck portion comprises:
   a metal portion; and
   a non-metallic washer fixedly attached to the metal portion;
   a first bracket having an adaptor portion fixedly holding the shaft at a first end; and
   a second bracket having a flange portion rotatably mounted on the shaft such that the second bracket is rotatably coupled to the first bracket, wherein the non-metallic washer is to engage with the second bracket to provide a torsional resistance to the second bracket.

6. The hinge assembly of claim 5, wherein the non-metallic washer is comprised of carbon fiber, and wherein the non-metallic washer is mounted on the shaft and attached to the metal portion through a press fit and adhesive.

7. The hinge assembly of claim 5, wherein the composite neck portion is disposed between the first bracket and the second bracket such that the non-metallic washer of the composite neck portion is to physically engage with the second bracket.

8. The hinge assembly of claim 5, comprising a friction mechanism mounted on the shaft at a second end and compressively engaged with the second bracket to provide frictional force between the first bracket and the second bracket.

9. The hinge assembly of claim 8, wherein the friction mechanism comprises:
   a first cam member having a first cam face at one side, wherein another side fixedly engages with the flange portion via a coupling feature;
   a second cam member having a second cam face at one side, the second cam face provided corresponding to the first cam face;
   a fastener secured to the shaft at the second end; and
   at least one disc-spring disposed between the second cam member and the fastener, wherein the at least one disc-spring is disposed on other side of the second cam member, which is opposite to the second cam face.

10. The hinge assembly of claim 9, wherein the shaft rotatably supports the second bracket and the first cam member, and unrotatably supports the first bracket, the second cam member, the at least one disc-spring, and the fastener.

11. An electronic device comprising:
a first housing;
a second housing; and
a hinge assembly pivotally coupled to the first housing and the second housing along an axis, wherein the hinge assembly comprises:
  a shaft having a composite neck portion, wherein the composite neck portion comprises:
    a metal portion; and
    a non-metallic washer fixedly attached to the metal portion;
  a first bracket having a first portion fixedly holding the shaft and a second portion fixedly engaged with the first housing; and
  a second bracket having a third portion rotatably mounted on the shaft and a fourth portion fixedly engaged with the second housing, wherein the non-metallic washer is to engage with the second bracket to provide a torsional resistance to the second housing.

12. The electronic device of claim 11, wherein the hinge assembly further comprises:
a friction mechanism mounted on the shaft and physically engaged with the second bracket at one side to provide frictional force between the first housing and the second housing, and wherein the composite neck portion is fixedly disposed between the first bracket and the second bracket such that the non-metallic washer is to physically engage with the second bracket on another side to provide the torsional resistance.

13. The electronic device of claim 11, wherein the first housing comprises a display and the second housing comprises at least one of a keyboard and a touchpad.

14. The electronic device of claim 11, wherein the first housing comprises at least one of a keyboard and a touchpad and the second housing comprises a display.

* * * * *